United States Patent [19]

Mochizuki et al.

[11] 4,193,679

[45] Mar. 18, 1980

[54] ELECTROPHOTOGRAPHIC APPARATUS COMPRISING IMPROVED IMAGING SYSTEM

[75] Inventors: Manabu Mochizuki; Kohji Suzuki; Hajime Oyama; Teruyuki Ohnuma, all of Tokyo, Japan

[73] Assignee: Ricoh Company, Ltd., Tokyo, Japan

[21] Appl. No.: 827,055

[22] Filed: Aug. 23, 1977

[30] Foreign Application Priority Data

Aug. 24, 1976 [JP] Japan .................................. 51-100859

[51] Int. Cl.$^2$ ........................ G03B 27/00; G03B 27/76

[52] U.S. Cl. .......................................... 355/1; 355/69; 355/71

[58] Field of Search ........................ 355/1, 3 R, 67, 69, 355/71

[56] References Cited

U.S. PATENT DOCUMENTS

| | | | |
|---|---|---|---|
| 3,409,354 | 11/1968 | Frank | 355/1 |
| 3,692,408 | 9/1972 | Nakamura | 355/69 |
| 3,731,611 | 5/1973 | Aasen et al. | 355/71 X |
| 3,742,295 | 6/1973 | Irie | 355/69 X |
| 3,815,992 | 6/1974 | Ogawa | 355/69 |
| 3,977,777 | 8/1976 | Tanaka et al. | 355/1 |

*Primary Examiner*—Fred L. Braun
*Attorney, Agent, or Firm*—Frank J. Jordan

[57] ABSTRACT

One or more rows of focussing optical fibers are disposed between an original document carrier and a photoconductive member. An illumination lamp illuminates an original document on the carrier and the fibers focus an image of a linear portion of the document onto the photoconductive member. Relative movement between the document carrier, fibers and photoconductive member perpendicular to the row or rows of fibers is produced to scan the document. An aperture assembly is provided between the fibers and the photoconductive member difining an aperture wide enough that unevenness of the intensity of the image on the photoconductive member due to the individual fibers is eliminated. The intensity of the light image is controlled by utilization of a variable transformer or triac provided to the illumination lamp.

5 Claims, 8 Drawing Figures

ELECTROPHOTOGRAPHIC APPARATUS COMPRISING IMPROVED IMAGING SYSTEM

BACKGROUND OF THE INVENTION

The present invention relates to an electrophotographic apparatus comprising an improved imaging system.

It has been proposed in the art to utilize focussing optical fiber arrays in the optical systems of electrophotographic apparatus such as electrostatic copying machines. The purpose of the optical system in such an apparatus is to focus an image of the original document onto a photoconductive member to produce an electrostatic image through localized photoconduction.

The focussing optical fibers are arranged in one or more parallel rows between the document and photoconductive member and relative movement is produced for scanning. Such an arrangement offers a number of advantages including reduction of the overall size of the apparatus, elimination of complex optical systems including mirror arrangements and evenness of illumination. In the latter case, to be more specific, the image does not vary from the center to the edges either in intensity or magnification. In addition, such an arrangement reduces image distortion, facilitates adjustment of image intensity and allows easy shielding of light from portions of the photoconductive member which are not to be exposed.

The image intensity has been controlled in the prior art by means of an adjustable exposure aperture provided between the optical fibers and the photoconductive member. Such adjustment is required for copying colored original documents so that the background prints white, copying low contrast documents and compensating for deterioration of the photoconductive member. In addition, adjustment is required to compensate for contamination of the optical system and other factors.

A serious problem has, however, been encountered in the practical embodiment of exposure control by means of an adjustable aperture in that a pattern of stripes is produced when the width of the aperture is excessively reduced. This is due to the fact that the optical fibers are arranged in rows which are spaced from each other.

Generally, an unevenness of intensity on the order of 2% is not noticeable, but unevenness on the order of 8% produces quite noticeable and objectionable striped patterns. An unevenness of 8% is often produced in practical applications involving copying certain types of documents.

SUMMARY OF THE INVENTION

The present invention overcomes the problem of striped image intensity patterns in electrophotographic apparatus utilizing focussing optical fiber arrays by maintaining the aperture at a fixed width and varying the intensity of illumination of the document. The width of the aperture is large enough to preclude the formation of a striped pattern. Illumination control is accomplished by means of a variable transformer or triac provided to an illumination lamp.

It is an object of the present invention to eliminate the formation of striped patterns in electrophotographic apparatus utilizing focussing optical fibers as main optical elements.

It is another object of the present invention to provide an electrophotographic apparatus comprising means for accomplishing effective exposure control in combination with even image intensity.

It is another object of the present invention to provide a generally improved electrophotographic apparatus.

Other objects, together with the foregoing, are attained in the embodiments described in the following description and illustrated in the accompanying drawing.

DESCRIPTION OF THE PREFERRED EMBODIMENTS

While the electrophotographic apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
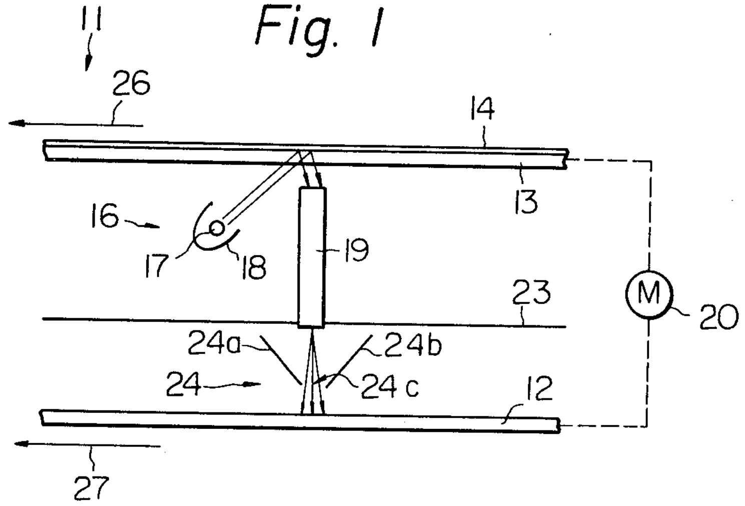
FIG. 1 is a schematic view of an electrophotographic apparatus embodying the present invention.

Referring now to FIG. 1 of the drawing, an electrophotographic apparatus embodying the present invention is generally designated by the reference numeral 11 and comprises a photoconductive member 12. Although the member 12 is shown as being in the form of a plate, it may equivalently be in the form of a drum or endless belt. Although the construction of the member 12 is not shown in detail, the member 12 is generally formed of an electrically conductive support with a photoconductive layer formed on the upper surface thereof as viewed in the drawing.

The apparatus 11 further comprises a transparent document carrier or platen 13 which carries an original document 14 which is to be electrostatically reproduced. The document 14 is placed face down on the platen 13 and illuminated from below, through the platen 13, by a light source 16 which comprises an illumination lamp 17 and a reflector 18.

Figure 2A:
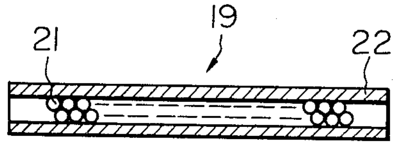
FIG. 2*a* is a transverse sectional view of a focussing optical fiber array of the electrophotographic apparatus.
Figure 2B:
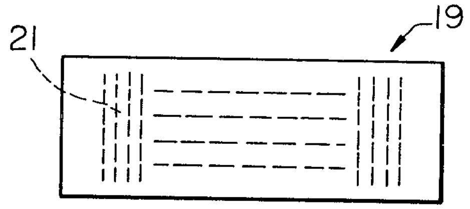
FIG. 2*b* is a side elevational view of the optical fiber array.

A focussing optical fiber array 19 is operatively disposed between the platen 13 and the member 12 in a perpendicular relationship. The array 19 is shown in greater detail in FIGS. 2*a* and 2*b* and comprises a plurality of focussing optical fibers 21 arranged in one or more parallel rows. As illustrated, two rows of optical fibers 21 are provided. Only a few of the optical fibers 21 are shown and only one is designated by the reference numeral 21 to avoid cluttering of the drawing. The optical fibers 21 are retained through embedment in a block 22 of a resin or plastic material. The opposite ends of the optical fibers 21 are not covered by the block 22 and are finely polished.

The optical fibers 21 are manufactured in such a manner that the index of refraction thereof is maximum at the central axis and decreases in the radial direction from the central axis. In this manner the optical fibers 21 act as converging lenses.

A shield 23 is provided between the platen 13 and member 12 to prevent stray light from the light source 16 from erroneously exposing the member 12. The array 19 sealingly extends through an opening (not designated) in the shield 23. Also illustrated in FIG. 1 is an aperture assembly 24 comprising aperture plates 24a and 24b provided on opposite sides of the array 19. The aperture plates 24a and 24b are coextensive with the array 19 and define an exposure aperture 24c therebetween.

In operation, the member 12 is electrostatically charged in the absence of light. The platen 13 and thereby the original document 14 are moved leftwardly relative to the array 19 by a drive system 20 as indicated by an arrow 26, or perpendicular to the rows of optical fibers 21. The light source 16 illuminates the document 14 and the array 19 focusses a light image of a linear portion of the document 14 onto the member 12. Assuming that the magnification factor is unity, the member 12 is moved leftwardly by the drive system 20 as indicated by an arrow 27 at the same speed as the platen 13. In this manner, the document 14 is scanned and an electrostatic image thereof formed on the member 12 through localized photoconduction. Although the operations following the exposure or imaging of the member 12 are not the subject matter of the present invention, they may be summarized by stating that a toner substance is applied to the member 12 to form a toner image which is transferred to a sheet of copy paper. The toner image is thermally or otherwise fixed to the copy sheet to provide a permanent reproduction of the original document 14.

In an apparatus of the present general configuration as proposed in the prior art, the intensity of the light image is adjusted by moving one or both of the aperture plates 24a and 24b to vary the width of the aperture 24c. As discussed hereinabove, this creates a problem where the width of the aperture 24c is reduced by an excessive amount.

Figure 3:
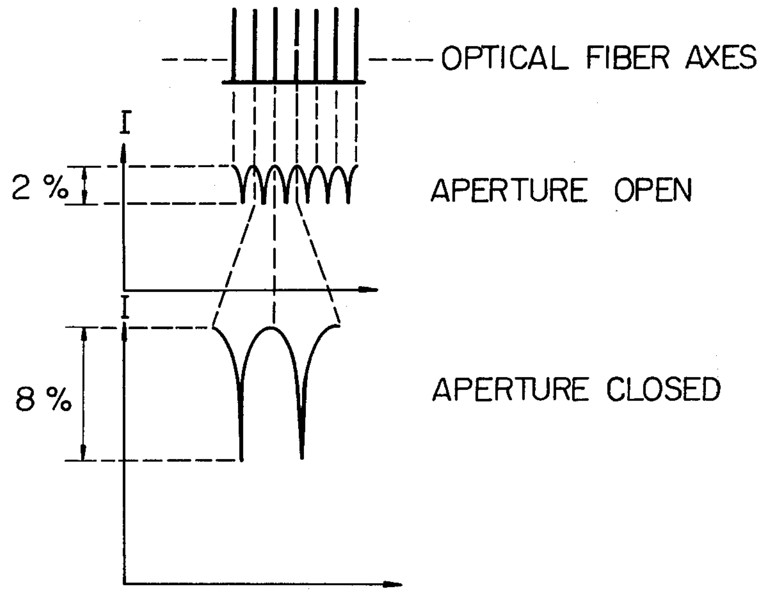
FIG. 3 is a graph showing the image intensity produced by the optical fiber array at two different width settings of a variable aperture.
Figure 4:
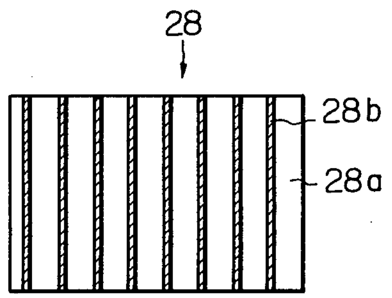
FIG. 4 is a diagram illustrating the striped pattern produced by an excessively small aperture width.

This effect is illustrated in FIGS. 3 and 4. The vertical lines in the upper portion of the diagram of FIG. 3 indicate the optical axes of adjacent optical fibers 21. The central and lower portions of FIG. 3 illustrate the relative image intensity I with the aperture 24c open and closed to maximum relative extents. In the lower portion of FIG. 3, representing the aperture 24c in the maximum closed position, the horizontal axis is expanded to more clearly illustrate the intensity distribution. These diagrams were plotted under the condition that the original document 14 was a sheet of white paper.

It will be seen that the image intensity I is maximum at the optical axes of the optical fibers 21 and minimum half-way between adjacent fibers 21. With the aperture 24c open to a maximum extent, the intensity variation is about 2% and does not have a noticeable effect on the copy. However, with the aperture 24c closed to a maximum extent, the intensity variation is increased to about 8%.

FIG. 4 illustrates the effect of this phenomenon on a finished copy 28 of an original document in the form of a white sheet of paper having a relative density of 0.4. With the aperture 24c closed to the maximum extent, the copy 28 comprises a background area 28a having a relative density of 0.35 to 0.45 and a pattern of dark stripes 28b, only one being designated, having a relative density of 0.55 to 0.75. This is due to the arrangement of the rows of optical fibers 21 and the movement of the member 12 perpendicular to the rows of optical fibers 21. The dark strips 28b correspond to the areas of the array 19 between adjacent optical fibers 21. This undesirable effect is most noticeable in copies of original documents having areas of medium density.

The present invention overcomes this problem by maintaining the aperture 24c at the fixed maximum value at which the unevenness of intensity of the light image is on the order of 2% or less. The intensity of the light image, or the exposure of the member 12, is controlled by varying the excitation of the illumination lamp 17 as will be described in detail below.

Figure 5:
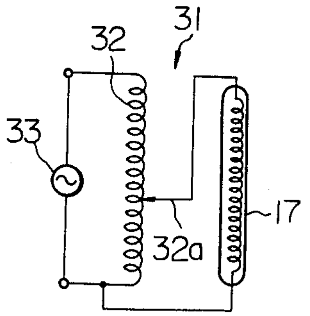
FIG. 5 is an electrical schematic diagram of a first embodiment of an image intensity control means of the present electrophotographic apparatus.

FIG. 5 illustrates a first embodiment of a control circuit 31 for adjusting the exposure of the photoconductive member 12. The circuit 31 comprises an autotransformer 32, the coil of which is connected across an alternating current source 33. The illumination lamp 17 is connected between one end of the coil of the autotransformer 32 and a slider 32a thereof. In this manner, the voltage applied to the illumination lamp 17 and thereby the intensity of illumination can be easily controlled by means of adjustment of the position of the slide 32a. This, in turn, provides effective and precise adjustment of the intensity of the light image focussed on the member 12 by the array 19 without the necessity of varying the width of the aperture 24c.

Although the transformer 32 is shown as being in the form of an autotransformer, it will be understood that it can be replaced by a transformer having separate primary and secondary windings, although not shown.

Figure 6:
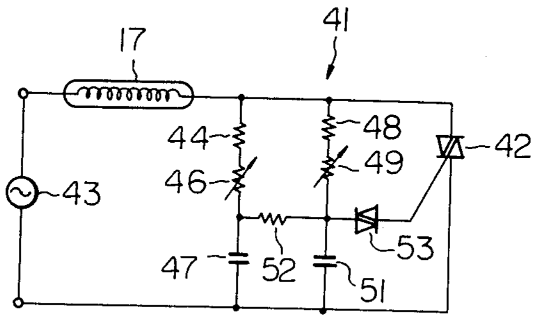
FIG. 6 is similar to FIG. 5 but shows a second embodiment of an image intensity control means.

FIG. 6 shows a second embodiment of a control circuit 41 which comprises a triac 42 connected in series with the lamp 17 across an alternating current source 43. A fixed resistor 44, a variable resistor 46 and a capacitor 47 are connected in series across the triac 42. In addition, a fixed resistor 48, a variable resistor 49 and a capacitor 51 are also connected in series across the triac 42. The junction of the resistor 46 and capacitor 47 is connected to the junction of the resistor 49 and capacitor 51 through a resistor 52. The junction of the resistor 49 and capacitor 51 is connected to the gate of the triac 42 through a diac 53.

In operation, an alternating voltage from the source 43 is applied to the capacitors 47 and 51 through the lamp 17 and resistors 44, 46 and 48, 49 respectively, thereby causing the capacitors 47 and 51 to alternatively charge and discharge. The voltage applied to the capacitor 51 is the summation of the voltage applied through the resistors 49 and 52. Thus, the voltage across the capacitor 51 is effected by the voltage across the capacitor 47. The triac 42 is triggered thereby allowing current to flow through the lamp 17 to energize the same when the voltage across the capacitor 51 exceeds a predetermined trigger level. The triac 42 is turned off when the instantaneous voltage from the source 43 drops below another predetermined value. The firing or phase angle of the triac 42 and thereby the length of time the triac 42 conducts during each alternating current cycle is adjustable by means of the variable resistors 46 and 49. Thus, precise control of the intensity of the lamp 17 and thereby the exposure of the member 12 can be accomplished through variation or either or both of the variable resistors 46 and 49.

Figure 7:
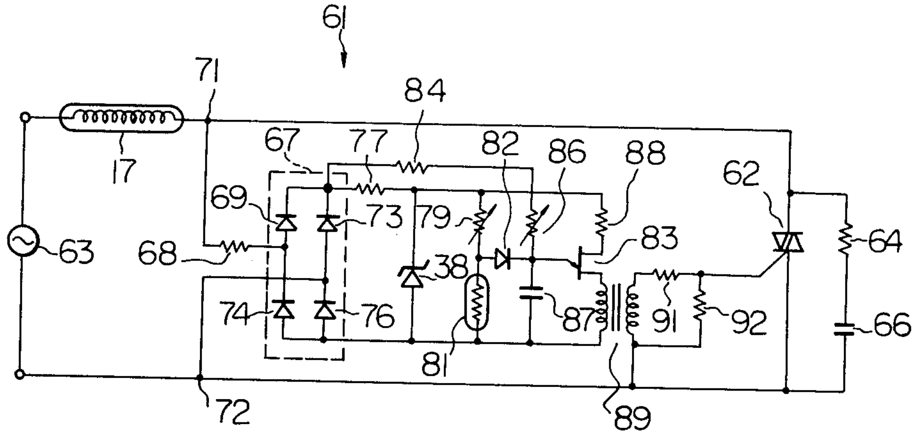
FIG. 7 is also similar to FIG. 5 but shows a third embodiment of an image intensity control means.

FIG. 7 illustrates a third embodiment of a control circuit 61 in which the diac 53 is replaced by a relaxation oscillator as will be described in detail below. The circuit 61 comprises a triac 62 which is connected in series with the lamp 17 across an alternating current source 63. A resistor 64 and capacitor 66 are connected in series with each other across the triac 62. A full-wave bridge rectifier 67 has its input (not designated) connected across the triac 62 through a current limiting resistor 68. More specifically, the rectifier 67 comprises a diode 69 having its anode connected through the resistor 68 to the lamp 17 at a circuit point 71. The anode of a diode 73 is connected to the source 63 at a circuit point 72. The cathodes of the diodes 69 and 73 are connected together.

The cathode of a diode 74 is connected to the anode of the diode 69 and the cathode of a diode 76 is connected to the anode of the diode 73. The anodes of the diodes 74 and 76 are connected together. A resistor 77 and a zener diode 38 are connected in series with each other across the output (not designated) of the rectifier 67. More specifically, the resistor 77 is connected at one end to the cathode of the diode 73 and at its other end to the cathode of the zener diode 38. The anode of the zener diode 38 is connected to the anode of the diode 76. A voltage divider (not designated) comprising a variable resistor 79 and a thermistor 81 connected in series with each other is connected across the zener diode 38. The junction of the resistor 79 and thermistor 81 is connected to the anode of a diode 82, the cathode of which is connected to the emitter of a unijunction transistor 83. A fixed resistor 84, variable resistor 86 and capacitor 87 are connected in series with each other between the cathode of the diode 73 and the anode of the diode 76. The junction of the resistor 86 and capacitor 87 is connected to the cathode of the diode 82 and also to the emitter of the unijunction transistor 83.

The unijunction transistor 83 is connected in series with a resistor 88 and the primary winding of a pulse transformer 89 across the zener diode 38. Resistors 91 and 92 are connected in series with each other across the secondary winding of the pulse transformer 89. The junction of the resistors 91 and 92 is connected to the gate of the triac 62. The unijunction transistor 83 in combination with the resistors 84 and 86 and capacitor 87 contitute a relaxation oscillator (not designated).

In operation, the voltage between the circuit points 71 and 72 is full-wave rectified by the rectifier 67 and limited in magnitude or clamped by the zener diode 38 which provides a pulse shaping function. The varying electrical signal across the zener diode 38 is in the form of a generally trapezoidal wave and is voltage divided by the resistor 79 and thermistor 81. This signal is applied through the diode 82 to the capacitor 87 which is connected to the emitter of the unijunction transistor 83. The output voltage of the rectifier 67 is also applied to the emitter of the transistor 83 through the resistors 84 and 86, causing the capacitor 87 to alternatively charge and discharge.

The transistor 83 is normally non-conductive and is rendered conductive when the voltage across the capacitor 87 exceeds a predetermined value. This causes the emitter resistance of the transistor 83 to drop and the capacitor 87 to discharge through the transistor 83, thereby rendering the same conductive. This causes the pulse transformer 89 to generate a pulse which is fed to the triac 62 causing the same to fire and pass current through itself and the lamp 17. This action is automatically and periodically repeated to provide a train of pulses.

The trigger level of the unijunction transistor 83 and thereby the firing angle of the triac 2 may be precisely adjusted by means of either or both of the variable resistors 79 and 86. This enables the length of time per alternating current cycle that the lamp 17 is energized to be advantageously adjusted without recourse to variation of the width of the aperture 24c.

In summary, it will be seen that the present invention overcomes the problem of exposure control in an electrophotographic apparatus comprising focussing optical fibers as the main optical elements and precludes the formation of undesired striped patterns in copies. Various modifications will become possible for those skilled in the art after receiving the teachings of the present disclosure without departing from the scope thereof.

What is claimed is:

1. An electrophotographic apparatus comprising in combination:

- a photoconductive member;
- an original document carrier for supporting an original document;
- a light source comprising an illumination lamp for illuminating the document.
- an optical fiber array including a row of focussing optical fibers operatively disposed between the document carrier and the photoconductive member for focussing a light image of the document on the photoconductive member;
- means for producing relative movement between the document carrier, fiber array and photoconductive member to scan the document;
- means defining an exposure aperture between the fiber array and the photoconductive member, the width of the aperture being sufficiently large that the intensity of the light image is substantially uniform; and
- control means for adjusting the intensity of the light source and thereby the intensity of the light image, said control means comprising a triac operatively connected to the lamp and phase control means for adjusting the firing angle of the triac, said phase control means comprising a unijunction transistor operatively connected to the triac and signal producing means for applying a varying electrical signal to the unijunction transistor.

2. An apparatus as in claim 1, further comprising a pulse transformer operatively connected between the unijunction transistor and the triac.

3. An apparatus as in claim 1, in which the signal producing means comprises a rectifier having an input connected across the triac and a signal shaping circuit connected between an output of the rectifier and an emitter of the unijunction transistor.

4. An apparatus as in claim 3, in which the signal shaping circuit comprises a zener diode for limiting a magnitude of the electrical signal.

5. An apparatus as in claim 1, in which the signal producing means is constructed so as to constitute a relaxation oscillator in combination with the unijunction transistor.

* * * * *